March 19, 1968   J. R. ERWIN ET AL   3,373,928
PROPULSION FAN
Filed Aug. 29, 1966   2 Sheets-Sheet 1
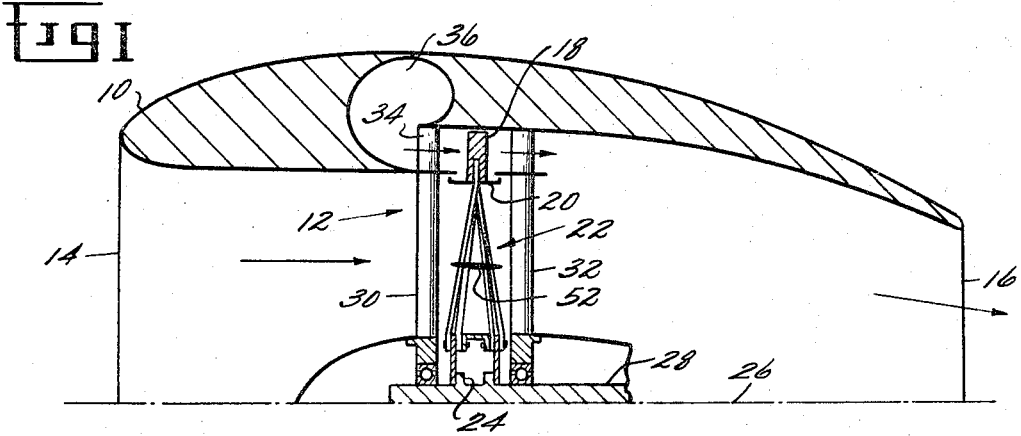
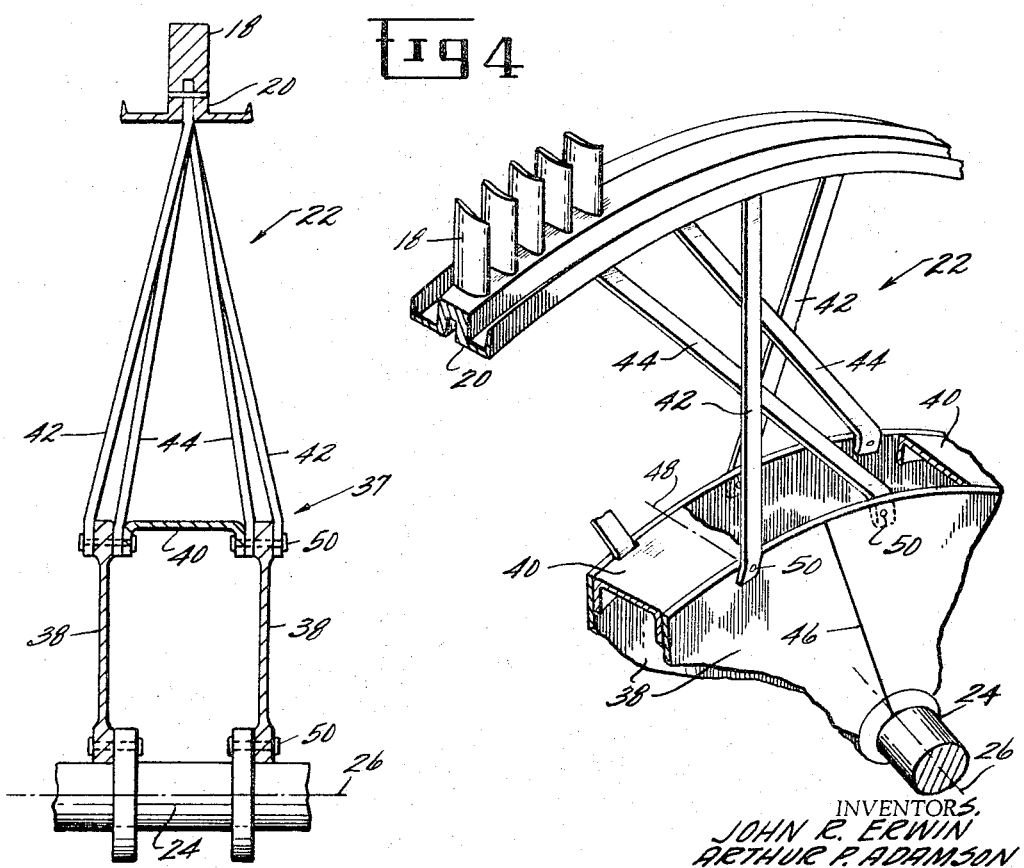
INVENTORS.
JOHN R. ERWIN
ARTHUR P. ADAMSON
BY
John F. Cullen
ATTORNEY

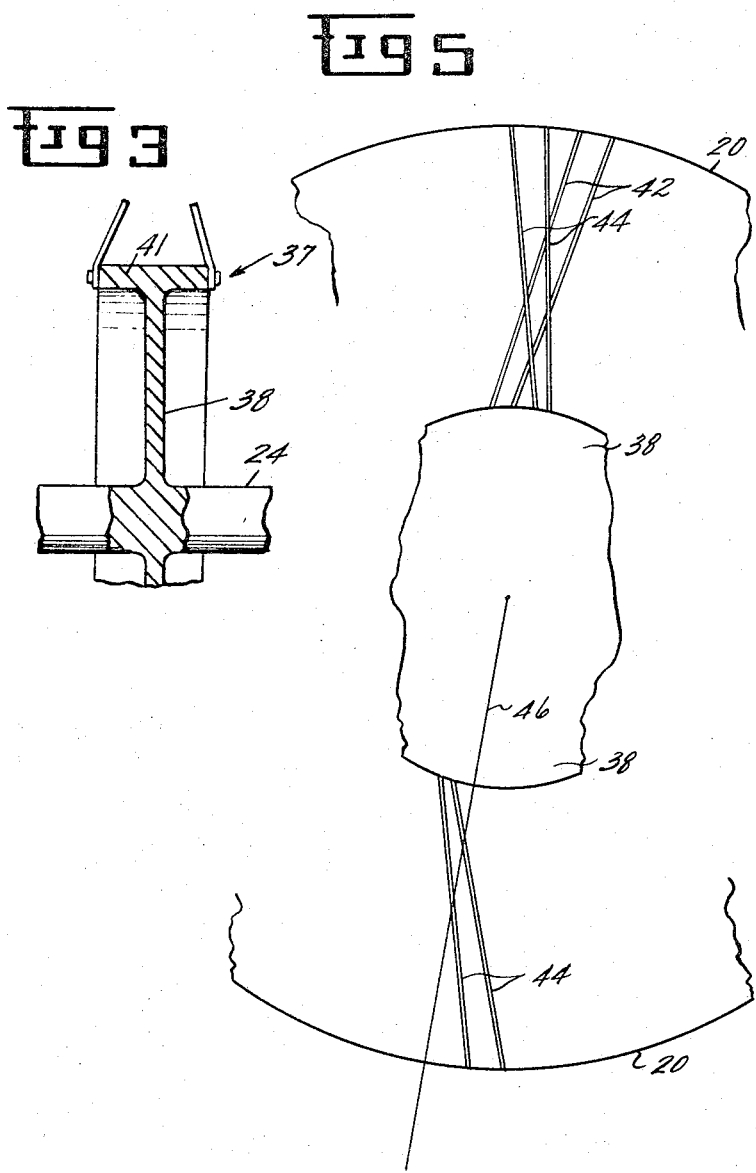

United States Patent Office 3,373,928
Patented Mar. 19, 1968

3,373,928
PROPULSION FAN
John R. Erwin, Wyoming, Ohio, and Arthur P. Adamson, Marblehead, Mass., assignors to General Electric Company, a corporation of New York
Filed Aug. 29, 1966, Ser. No. 575,795
12 Claims. (Cl. 230—116)

ABSTRACT OF THE DISCLOSURE

The invention is directed to a quiet aircraft propulsion fan that uses many short-chord airfoils in a bicycle-spoke arrangement to hold the tip turbine buckets. Angling and slanting of the airfoils provides triangular support for stiffness and the system employs the airfoils in a number which, multiplied by the speed, produces a minimum of 14,000 cycles per second or above the generally audible sound level.

---

In reaction engines of the type in common use in aircraft, whether fan engines or straight turbojets, it is well known that the noise generated by such powerplants is objectionable. The noise may be caused by the high velocity exhaust gases in a turbojet and the resultant shearing action of the ambient air. This has been modified somewhat by the use of sound suppressors on the tailpipes of turbojets and by the advent of the fan engine which moves larger quantities of air at lower velocities. However, another and important source of noise is the inlet noise or blade noise which is caused by the high rotational speed of the compressor or fan blades and the generation by the blades of a fundamental frequency tone with higher harmonics. For example, a series of fan blades rotating at high speed and close to a series of stator blades, either upstream or downstream, creates an annoying clear and distinct sound pulse as each rotor blade passes a stationary blade. Multiplied many fold by many blades and by the high rotational speed, an objectionable noise is generated. It is well known that high frequency sounds attenuate rapidly as the distance from the sound source increases. Above a certain frequency, the noise or sound will be inaudible to the human ear.

The main object of the present invention is to provide a propulsion fan which uses a large number of very short chord airfoil blades so arranged to provide adequate torque transmission such that the total number of airfoils times the design rotational speed of the fan is a frequency above the audible sound level.

Another object is to provide such a fan wherein the structural arrangement is similar to a bicycle wheel for suitable tangential torque transmission and triangular frame stability in two planes.

A further object is to provide such a fan wherein the torque load is distributed among the blades.

Another object is to provide such a fan that is light weight and low cost because of short chord airfoil blades and which uses particular attachment features of the airfoils to provide acoustic and mechanical advantages in sound generation and load handling.

A further object is to provide such a fan which may be a tip turbine fan and have suitable damping structure between the ends of the fan blades.

Briefly stated, the invention is directed to a propulsion fan for aircraft which comprises a rotating shaft that includes an axially extending base supported from a load carrying single disc means or plural discs such as a pair of connected axially spaced disc means. A circumferential outer rim is provided midway of the base and radially out from the disc means. The disc means and rim are interconnected by a plurality of short chord airfoils that are preferably equally spaced at their outer ends on the rim and half of the airfoils are connected to one end of the base and half to the other. The airfoils are preferably slanted to form an angle to the radius between the hub and rim and form a triangular cross-section in a plane that contains the axis of rotation. The airfoils may be connected to the rim in a common plane and, when plural discs are used, the base may be formed by spacing them apart by axial connecting means at their periphery. Alternately, one base may be used with a single disc and the airfoils may be attached near its forward and aft ends. Additionally, a particular airfoil arrangement wherein alternate pairs of adjacent airfoils extend in opposite directions from a radius is disclosed and, preferably, each airfoil of a pair is connected to the base to form a triangular construction in the plane of rotation. Further, the inner airfoil ends are alternately connected to the base in axial and peripheral spaced relation. This provides a rigid torque transmitting structure as well as aerodynamic advantages. The number of airfoils so arranged is preferably chosen so that the product of the number of airfoils and the design rotational speed of the fan is a minimum of 14,000 cycles per second or is above the generally audible sound level.

While the specification concludes with claims particularly pointing out and distinctly claiming the subject matter which is regarded as the invention, it is believed the invention wll be better understood from the following description taken in connection with the accompanying drawing in which:

FIGURE 1 is a partial cross-sectional view of a lift or propulsion fan showing the general triangular arrangement in a plane passing through the axis of rotation.

FIGURE 2 is a partial cross-sectional view of a specific preferred construction of the fan shown in FIG. 1;

FIGURE 3 is a view, similar to FIG. 2, of an alternate arrangement;

FIGURE 4 is a partial perspective of the interconnection of the airfoils with the rim and discs of FIG. 2 modification; and FIGURE 5 is a partial diagrammatic plan view of the structure shown in FIG. 2.

As used herein, the term fan is intended to include a stage or stages of a gas turbine compressor. For convenience only, the invention will be described in connection with a tip turbine fan as carried by the preferable construction of a pair of axially spaced discs to form a base member as shown in FIG. 2. Also, the term "propulsion fan" will be used for convenience although it will be apparent that whether it propels or lifts the aircraft is incidental and the term is intended to cover all applications wherein the structural arrangement may be used.

Referring first to FIG. 1, there is partially shown a powerplant of the cruise fan type such as generally shown in U.S. Patent 3,216,654 of common assignment. That patent illustrates a spoked arrangement which may use airfoils and is designed to support turbine buckets separate and easily removable from the fan. In such a powerplant, a nacelle 10 is provided to house a fan generally indicated at 12 to pump air through duct 14 and exhaust it out nozzle 16 for thrust. The fan may be driven by any suitable means and conveniently is driven from a gas generator, not shown, by turbine buckets 18 mounted on a rim 20 that is supported by fan blades generally indicated at 22 outward of a central shaft 24 that rotates about axis 26. Any other suitable means for driving the fan, other than pneumatic as shown, such as geared for direct drive by an inner jet engine connecting at 28 may be employed. In order to aerodynamically handle the air properly, inlet guide vanes 30 and outlet guide vanes 32 may be provided together or singly, as required. Suitable exhaust gases may be directed by nozzles 34 from scroll 36 to buckets 18 to drive the fan. Such is the general arrangement of the propulsion or lift fan of the instant invention.

Because of the noise created by the high rotational speed of the fan and the passing of the fan blades 22 close to the stationary guide vanes 30 and 32 or their equivalent, it is desired to provide fan structure that has a high pumping capacity and pressure differential and generates the fundamental fan noise above the audible sound level. To this end, the individual fan blades 22 are comprised of a large number of very short chord airfoils to act as the fan blades. By short chord, it is intended that the chords be approximately one inch or less. As a result, a large number of such fan blades are required and the fan assumes a general bicycle-like wheel arrangement with important distinctions.

Referring next to FIG. 2, it will be seen that the shaft 24 carries an axial extending base generally indicated at 37 preferably in the form of a pair of axially spaced disc members 38 interconnected by member 40 substantially at the periphery of the discs. An equivalent alternate arrangement is shown in FIG. 3 where single disc member 38 has its axial base in the form of a broad band 41. Returning to the preferred construction of FIG. 2, there is disposed between the forward and the aft ends of the base, and preferably midway of the base ends and radially outward, a circumferential rim 20 which carries turbine buckets 18 as shown in FIG. 1. In order to connect the rim and discs, there is provided a plurality of many short chord airfoils 22 that act as fan blades. Structural rigidity is provided by connecting these airfoils in the desired manner. To this end, the airfoils are connected at their outer ends in equal spacing about rim 20 and preferably, as shown in FIGS. 2 and 4, they are also connected substantially in a common plane. While various alternating symmetrical arrangements of airfoil connections may be used within the scope of the invention, FIG. 4 illustrates the preferred and simple inexpensive embodiment.

As seen in FIG. 4 (and applicable to FIG. 3), the airfoils 22 are generally arranged in pairs of adjacent airfoils 42 and 44, respectively. For suitable torque transmission, whether the fan is being driven by the turbine buckets or the rotor is driving the fan, it is desired that the airfoils be axially spaced on the base. Thus, half of the airfoils are connected to one disc member and half to the other. To this end, these alternate pairs of adjacent airfoils extend angularly in opposite directions from a radius 46 as opposed to being radial airfoils. Thus, as seen in FIG. 4, at rim 20, the pair of airfoils 42 extends to the left of radius 46 and airfoils 44 are directed to the right of radius 46 or in the opposite direction. This forms a cascade of airfoils slanted or angled one away from radius 46 and another cascade slanted in the opposite direction away from radius 46 in an alternating symmetrical pattern. Additionally, each airfoil of a pair is preferably alternated on the base being connected to a different disc for mechanical rigidity. In FIG. 3, the airfoils are alternated on the base ends. As shown in FIGS. 2 and 4, the preferred arrangement is to have the adjacent airfoils 42 connected to different discs to provide an axially spaced relation on the base along axis 26 to form a triangular frame. Mechanical integrity is enhanced by also connecting the airfoils inner ends in a peripherally spaced arrangement as shown in FIGS. 4 and 5 where such connection permits more room for anchoring each airfoil. Thus, the inner ends of airfoils 42 are connected to their respective discs or base ends in a non-aligned manner such that line 48 parallel to axis 26 does not pass through the pin connection 50 of the adjacent airfoil—viz. there is also a peripheral spacing between the inner ends of the airfoils 42 to form a triangular frame in the plane of rotation. With the arrangement shown any pin connection or equivalent may be used to connect the airfoils in tension such as pin connection 50.

Referring next to FIG. 5, the diagrammatic layout of individual airfoils shown is intended to illustrate the different angular relations that may be provided between the individual airfoils and the radius 46. FIG. 5 also illustrates the peripheral spacing of the airfoils at the shaft or base and FIG. 4 illustrates the axial spacing of the airfoils at the base or disc area. It can be seen in FIG. 5 that a general triangular frame construction in the plane of rotation is provided by this orientation of the airfoils. Additionally, as seen in FIGS. 2 and 3, a second triangular frame construction is provided in cross-section in another plane that contains the axis of rotation.

The particular orientation and arrangement of the large number of short chord fan blades 22 provides for acoustics, aerodynamic, and mechanical improvements. The acoustic improvements occur because of the number which, as pointed out below, raises the frequency above the audible range. Additionally, the angled arrangement with respect to the radius 46 provides a shearing action on the wake of the stationary parts such as the guide vanes 30. This tends to prevent the wakes from the stationary vanes impinging on a full span of a moving blade at one time. Further, there is some aerodynamic benefit by the angularity or sweep near the fan blade tip where the Mach number may be very high resulting in compressibility effects and possible shock waves. Mechanically, the advantages of the dual triangular frame construction in both planes are clear as well as the axially spaced construction of the inner ends of the airfoils on the base to allow more room for anchoring the airfoils on the discs where difficulty is normally encountered because of lack of room. Further, airfoil weight decreases as chord length decreases and shaft and bearing weight decrease as airfoil weight decreases, so light fans result from this construction.

Having described the structural arrangement of the propulsion fan, it is important that a definite characteristic be observed. This is that the total number of airfoils is considerably higher than normal fan construction being in the order of ten fold or more. Because of the use of short chord airfoils, they may be manufactured cheaply by forming them substantially of stripstock and cutting them off as needed.

Any vibration is damped by suitable ring means 52 that may be connected to all or part of the airfoils between the rim and shaft as seen in FIG. 1.

With a large number of airfoils, the rate of airfoils passing any given point is extremely high. Further, there is a design rotational speed for the particular powerplant or propulsion fan which normally is a fixed number. Therefore, it is essential that the product of the total number of airfoils and the design rotational fan speed should be a minimum of 14,000 cycles per second which is normally above the audible range. While a cycles per second product below this number will give some weight and noise advantages, it is preferable that the product should not fall below 14,000 cycles and, by maintaining this characteristic the result is a propulsion fan of high aerodynamic and structural benefits as well as one that operates out of the audible sound range.

While there have been described preferred forms of the invention, obviously modifications and variations are possible in light of the above teachings. It is therefore to be understood that within the scope of the appended claims, the invention may be practiced otherwise than as specifically described.

We claim:
1. A propulsion fan for aircraft comprising,
 rotating shaft means including an axially extending base,
 rim means between the base ends and radially outward of the base, a plurality of short chord airfoils connected to the rim, half of said airfoils being connected to one end of the base and half to the other to form a triangular cross-section in a plane containing the axis of rotation, the product of the total number of airfoils and the design rotational fan speed being a minimum of 14,000 cycles per second.

2. Apparatus as described in claim 1 wherein turbine buckets are disposed on said rim means forming a tip turbine fan.

3. Apparatus as described in claim 1 wherein said airfoils are connected to said base and rim means in an alternating symmetrical pattern.

4. Apparatus as described in claim 1 having ring means connecting at least some of said airfoils between said rim and shaft.

5. A propulsion fan for aircraft comprising, rotating shaft means including a pair of axially spaced disc members, a circumferential rim intermediate and radially outward of the discs, a plurality of short chord airfoils connected in equal spacing at their outer ends to said rim, half of said airfoils being connected to one disc member and half to the other, said airfoils being disposed to form an angle to the radius and forming a triangular cross-section in a plane containing the axis of rotation, the product of the total number of airfoils and the design rotational fan speed being a minimum of 14,000 cycles per second.

6. Apparatus as described in claim 5 wherein said airfoils are connected to said rim substantially in a common plane.

7. Apparatus as described in claim 5 wherein axially extending means connects said discs and airfoils substantially at the periphery of said discs.

8. Apparatus as described in claim 6 wherein alternate pairs of adjacent airfoils extend in opposite directions from said radius and each airfoil of a pair is connected to a different disc to form a triangular construction in the plane of rotation.

9. Apparatus as described in claim 8 wherein adjacent airfoils on each disc are alternately connected to said disc in axial spaced relation.

10. Apparatus as described in claim 9 wherein said alternate connection of airfoils at said disc is peripherally spaced.

11. Apparatus as described in claim 10 wherein turbine buckets are disposed on said ring forming a tip turbine fan.

12. Apparatus as described in claimed 10 having ring means connecting at least some of said airfoils between said rim and shaft.

References Cited

UNITED STATES PATENTS

| | | | |
|---|---|---|---|
| 997,819 | 7/1911 | Holmes | 170—167 |
| 1,707,235 | 4/1929 | Sargent | 170—42 |
| 1,780,431 | 11/1930 | McCarroll | 170—160.13 |
| 1,880,995 | 10/1932 | Squires | 170—159 |
| 2,153,576 | 4/1939 | Kurth et al. | 98—39 |
| 2,273,756 | 2/1942 | Honerkamp | 170—171 |
| 3,216,654 | 11/1965 | Kappus | 230—116 |

ROBERT M. WALKER, *Primary Examiner.*